Aug. 16, 1949.  A. L. PAYTON  2,479,506
MOLDING SANDER
Filed Jan. 2, 1948
2 Sheets-Sheet 1

INVENTOR.
Andy Leslie Payton
BY
James Atkins
Attorney.

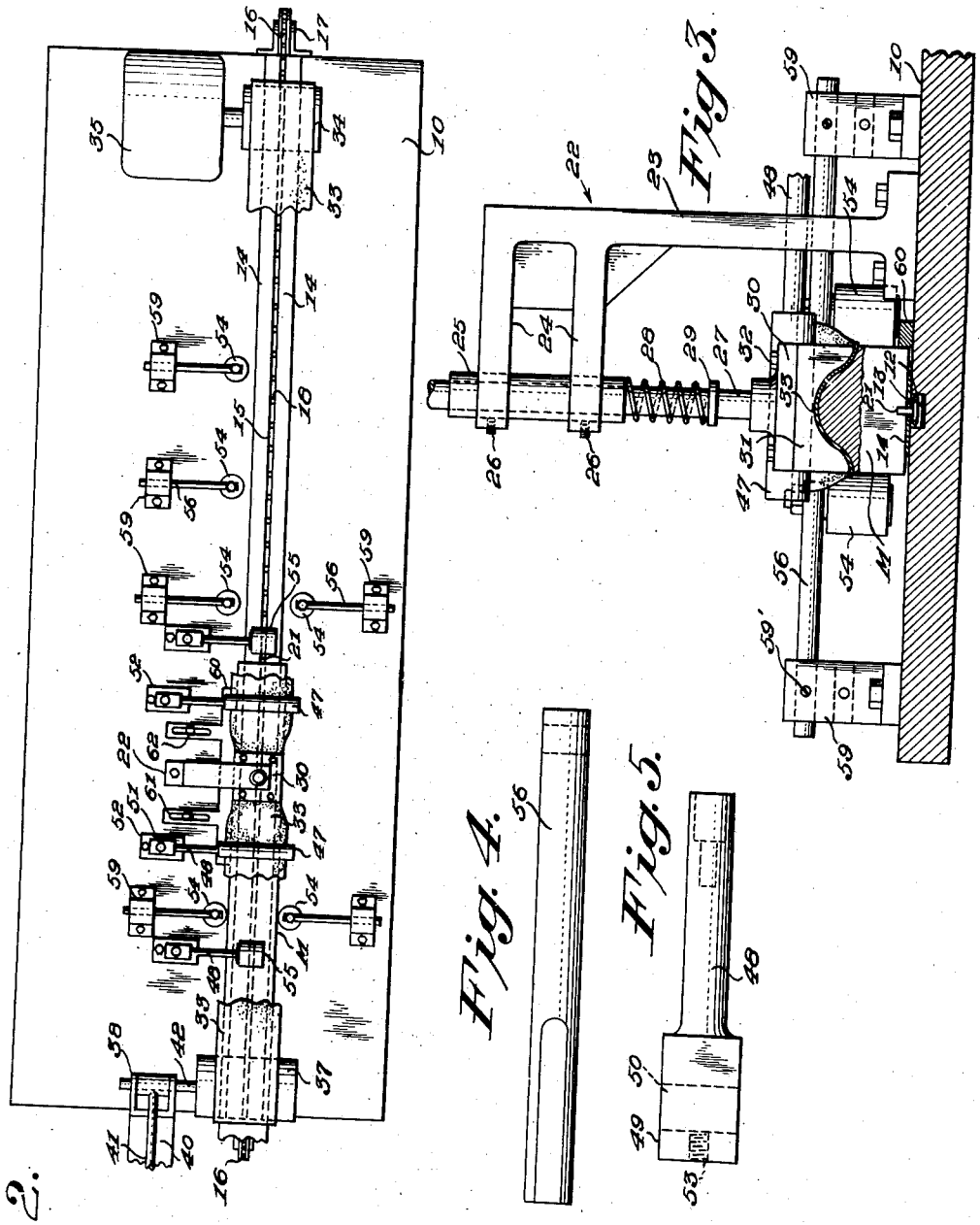

Patented Aug. 16, 1949

2,479,506

UNITED STATES PATENT OFFICE 2,479,506

MOLDING SANDER

Andy Leslie Payton, Bristol, Tenn.

Application January 2, 1948, Serial No. 197

3 Claims. (Cl. 51—138)

This invention relates to a moulding sander.

A primary object of the invention is the provision of a continuously operating sander whereby successive heights of moulding are capable of being sanded effectively in a relatively short period of time and with minimum effort on the part of an operator.

A further object of the invention is the provision of a moulding sander wherein lengths of moulding are successively conveyed in a direction toward a sanding head and such moulding of the sanding head being subjected to the action of a sanded surface moving continuously in a direction opposite to that in which the moulding is conveyed.

A still further object of the invention is the provision of a moulding sander which is relatively simple in construction, efficient in operation, and which is capable of manufacture and maintenance at relatively low cost.

Other objects and advantages of the invention will become apparent in the course of the following detailed description, taken in connection with the accompanying drawings, wherein Figure 1 is a side elevational view of the improved sander in accordance with a preferred structural embodiment thereof.

Fig. 2 is a top plan view partially broken away.

Fig. 3 is an enlarged transverse sectional view in planes of the broken line 3—3 on Fig. 1.

Fig. 4 is a side elevational view of a guide-supporting rod; the view being enlarged relative to Figures 1 and 2.

Fig. 5 is a side elevational view of another form of guide-supporting rod utilized in the sander structure.

Figure 1:
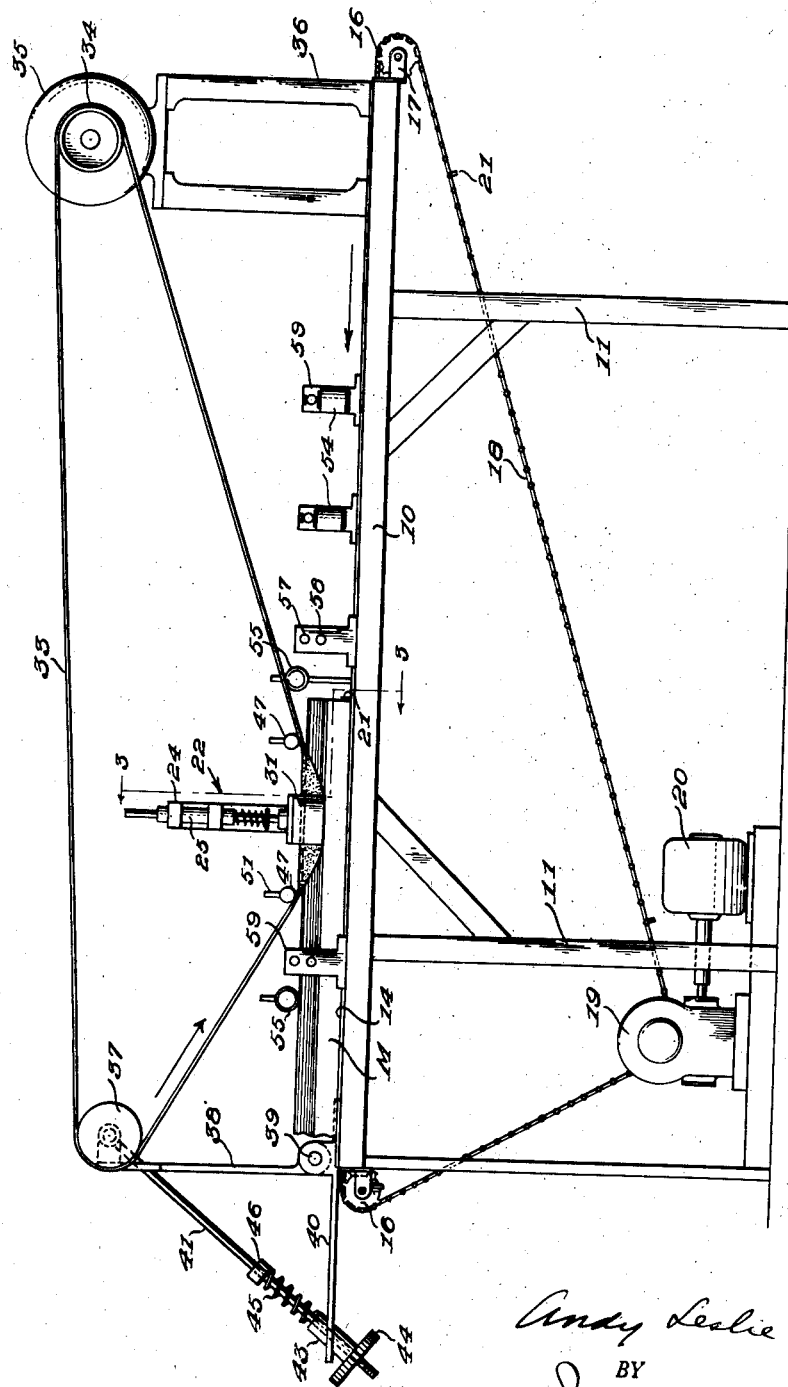

Referring now in detail to the drawings, a suitable table is provided for supporting the various elements entering into the sander structure as well as the moulding during sanding operations thereon, and such table includes a top 10 and suitable supporting legs 11.

The table top 10 is provided with a channel 12 in the upper face thereof, and which channel extends throughout the length of the top, as is indicated in Fig. 2.

A metal plate 13 rests upon the bottom of the channel 12 and is suitably secured therein, and a pair of metal plates 14 are suitably secured to the top 10 in overhanging relation to the channel 12 and with their adjacent edges in spaced relation in the provision of a slot 15.

A sprocket wheel 16 is supported at each end of the channel 12 and is rotatably supported in a bracket 17 suitably secured to the corresponding end of the table top 10.

A continuous sprocket chain 18 is engaged with the sprocket wheels 16 and with the run thereof between the sprocket wheels disposed within the channel 12 and between the plates 13 and 14, the former providing a wearing surface for the chain.

The sprocket chain 18 depends below top 10 and extends through a drive unit 19 which is driven by a motor 20. The drive unit may be of any desired form wherein a sprocket wheel therein is engageable with the chain 18, and various size sprocket wheels may be utilized in the unit for providing a desired speed of movement of the chain which, in operation, moves in the direction of the arrow in Fig. 1. The sprocket chain 18 is provided with projections 21 at desired spaced intervals for a purpose later to appear, and such projections travel through the slot 15.

A sanding head 22 is supported on the table top 10 intermediate the opposed ends thereof, and such head includes an upright 23 from which project vertically spaced and horizontally disposed arms 24. A sleeve 25 is secured in the arms as by set screws 26, and a cylindrical bar 27 is supported in the sleeve for vertical sliding movement therein, suitable means being provided if desired to restrain the bar against rotary movement in the sleeve.

A coil spring 28 encircles the bar 27 and has its opposite ends engaged with the lower end of sleeve 25 and a collar 29 on the bar 27, the spring thus acting to urge the bar downwardly. The bar 27 is disposed over the slot 15 and carries at its lower end a rectangular plate 30 to which any one of various moulding conformer blocks 31 are removably secured, as by screw bolts 32.

The moulding M is adapted to be fed lengthwise over the plates 14 by a projection 21 on the chain engaging the rearmost end of each piece of moulding being fed through the machine, and the moulding is adapted to pass beneath the conformer block 31, as is clearly indicated in Fig. 3.

The sanding of the moulding is effected by a belt 33 having a sanded surface, and such belt extends over a drive pulley 34 driven by a motor 35, both of which are supported substantially above the top 10 at one end thereof by a suitable bracket 36.

The belt further engages an idler pulley 37 supported adjacent the other end of the top on a bracket 38 pivotally supported at its lower end at 39 on a bracket rigidly secured to the top and including a horizontal portion 40. The pulley-supporting bracket 38 is adjustable about the pivot 39 for effecting proper tautness in the belt, and for this purpose a rod 41 has its upper end connected to the shaft 42 of the pulley 37 and the lower end of the rod extends through a bushing 43 in the portion 40 and is screw-threaded for cooperation therewith of an adjusting nut 44. A spring 45 is preferably disposed between the bushing 43 and a collar 46 on the rod 41 for maintaining the adjustment.

The belt 33 depends from the pulleys 34 and 37 and extends beneath and in engagement with the conformer block 31, the belt at this point assuming the surface configuration of the block and frictionally engaging the adjacent moulding surface under the urge of spring 28, as is clearly indicated in Fig. 3.

The structure further includes a number of guides for maintaining the moulding M in a rectilinear path of movement over the plates 14 and beneath the block 31, as well as a pair of belt guides 47 which are of elongated cylindrical form and extend transversely of the slot 15 and are disposed adjacent the sander head 22 at opposite sides thereof.

These belt guides are supported by rods 48 which include rectangular end portions 49 having apertures 50 for receiving vertical rods 51 projecting upwardly from bases 52 secured to the top 10. The rods 48 are provided with threaded apertures 53 for receiving screw bolts whereby the rods as well as belt guides 47 are vertically adjustable on the rods 51. The purpose of the belt guides 47 is to maintain the belt in proper position adjacent the conformer block 31, the belt remaining flat throughout its length from one guide 47 to the other, but between such guides the belt is deformed into conformity with the block 31, whereby the sanded surface of the belt engages the surface of the moulding M with uniform pressure for sanding same.

While, as shown in Figure 3, only the upper curved portion of the moulding is affected by the belt, the conformer block 31 may be of such form as to engage portions of the belt with opposite sides of the moulding. The aforementioned guides for the moulding comprise a plurality of vertically disposed rollers 54 engageable with opposite sides of the moulding M and a pair of horizontally disposed rollers 55 engageable with the top of the moulding. The rollers 54 are supported by rods 56 which are receivable in upper or lower apertures 57, 58 in brackets 59 which are provided with suitable securing means 59' for retaining the rods therein.

The rollers 55 are supported by vertically adjustable rods 48, as above described in connection with the belt guides 47.

An edge guide 60 is provided adjacent the sanding head 22 and is laterally adjustable as by cooperating slots and bolts 61 and 62.

From the above description, it will be apparent that a moulding sander is provided which is highly effective, in that the chain 18 feeds successive lengths of moulding to the sanding head 22 at a speed of from 20 to 120 feet per minute, and the sanding belt 33, which moves in the direction of the arrow in Fig. 1 or opposite to the moulding, travels approximately 2000 feet per minute. Thus it will be seen that there is a high relative movement between the belt and moulding and that the moulding is fed relatively fast through the machine, whereby a large quantity of moulding is capable of being sanded in a relatively short period of time.

While I have disclosed my invention in accordance with a single specific embodiment thereof, such is to be considered as illustrative only, and not restrictive, the scope of the invention being defined in the following claims.

What I claim and desire to secure by U. S. Letters Patent is:

1. A moulding sander comprising an elongated relatively wide horizontal support, a relatively narrow channel in the upper face of the support in substantial spaced relation to the opposite side edges thereof and extending throughout the length thereof, a metallic wear plate disposed on the bottom wall of said channel, a sprocket wheel rotatably supported adjacent to and beyond each of the opposite ends of the support, a sprocket chain operatively engaged with said wheels and having the upper run thereof disposed in said channel and resting on said wear plate, projections carried by said chain at predetermined intervals and projecting above the support for engaging the rear ends of successive sections of moulding, a sander head disposed above the support, a sanding belt extending about a pair of spaced pulleys supported above the support with the lower run of the belt extending between the support and said sander head, motor means for driving said chain and said belt, and a pair of metallic moulding-supporting plates secured to the upper face of the support in overhanging relation to said channel for confining the upper run of the chain therein, said plates having their adjacent overhanging edges spaced in the provision of a relatively narrow slot for receiving and guiding said projections.

2. A moulding sander according to claim 1, wherein said sander head includes a block having a lower surface of a formation corresponding with that of the moulding to be sanded and wherein the sanding belt engages said surface with a resulting deformation of the belt, and a vertically adjustable cylindrical guide disposed adjacent said sander head at each side thereof and extending transversely of the support for engaging the belt and confining the deformation thereof to the space between the guides.

3. A moulding sander according to claim 1, together with a plurality of vertically disposed roller guides disposed at each side of said channel for engaging opposite sides of the sections of moulding, a plurality of vertically adjustable horizontally extending roller guides for engaging the tops of the moulding sections, and an elongated edge guide mounted on the support for adjustment laterally thereof and disposed adjacent said sander head for engaging the corresponding sides of the moulding sections.

ANDY LESLIE PAYTON.

REFERENCES CITED

The following references are of record in the file of this patent:

UNITED STATES PATENTS

| Number | Name | Date |
|---|---|---|
| 1,000,296 | Sagerdahl | Aug. 8, 1911 |
| 1,030,473 | Kroeze | June 25, 1912 |
| 1,927,330 | Williams | Sept. 19, 1933 |
| 1,949,565 | Edwards | Mar. 6, 1934 |
| 1,962,765 | Crowley et al. | June 12, 1934 |
| 2,199,069 | Fowler | Apr. 30, 1940 |
| 2,250,720 | Morris | July 29, 1941 |
| 2,334,960 | Roth | Nov. 23, 1943 |
| 2,376,847 | Glike | May 22, 1945 |
| 2,408,648 | Inman | Oct. 1, 1946 |
| 2,421,289 | Roth et al. | May 27, 1947 |
| 2,426,764 | Czarnecki | Sept. 2, 1947 |